March 19, 1940. H. SCHEIBLER 2,193,844
HEARING-AID TRANSMITTER
Filed Dec. 28, 1936 3 Sheets-Sheet 1
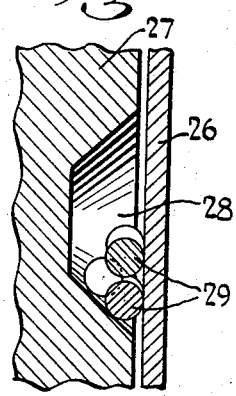
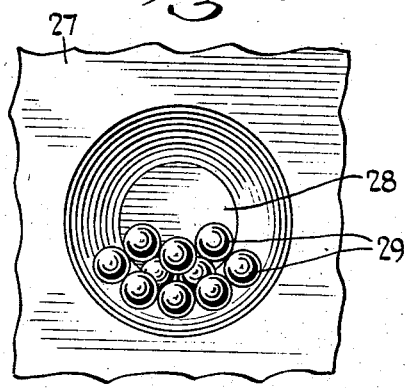
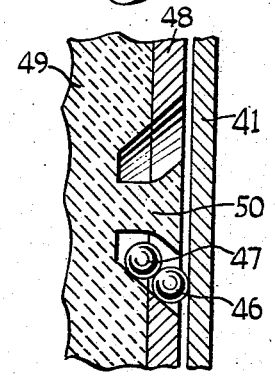
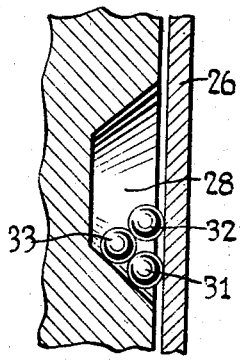
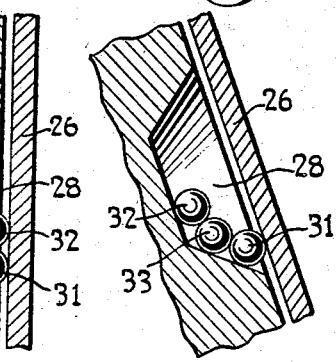
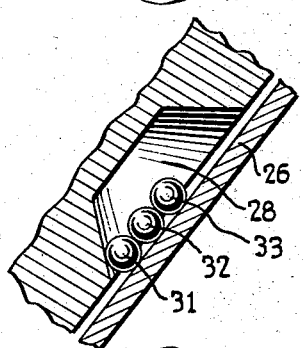
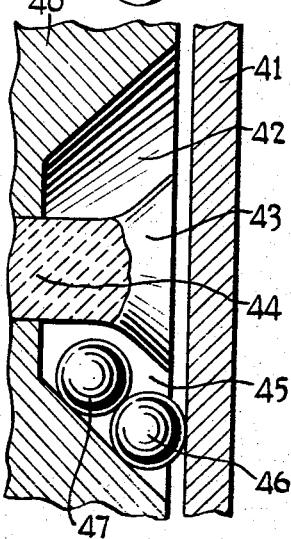
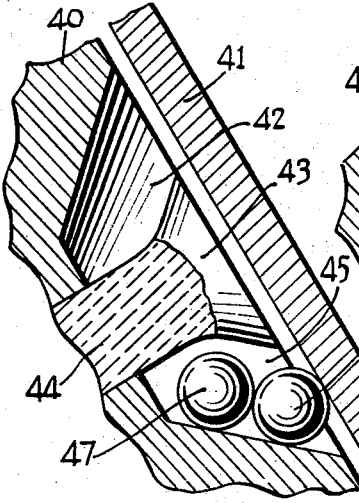
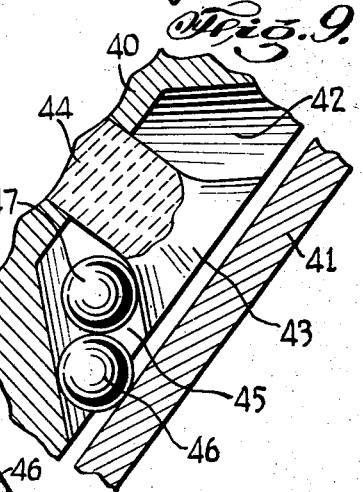
INVENTOR
HERMANN SCHEIBLER
BY Michael Pincks
ATTORNEY

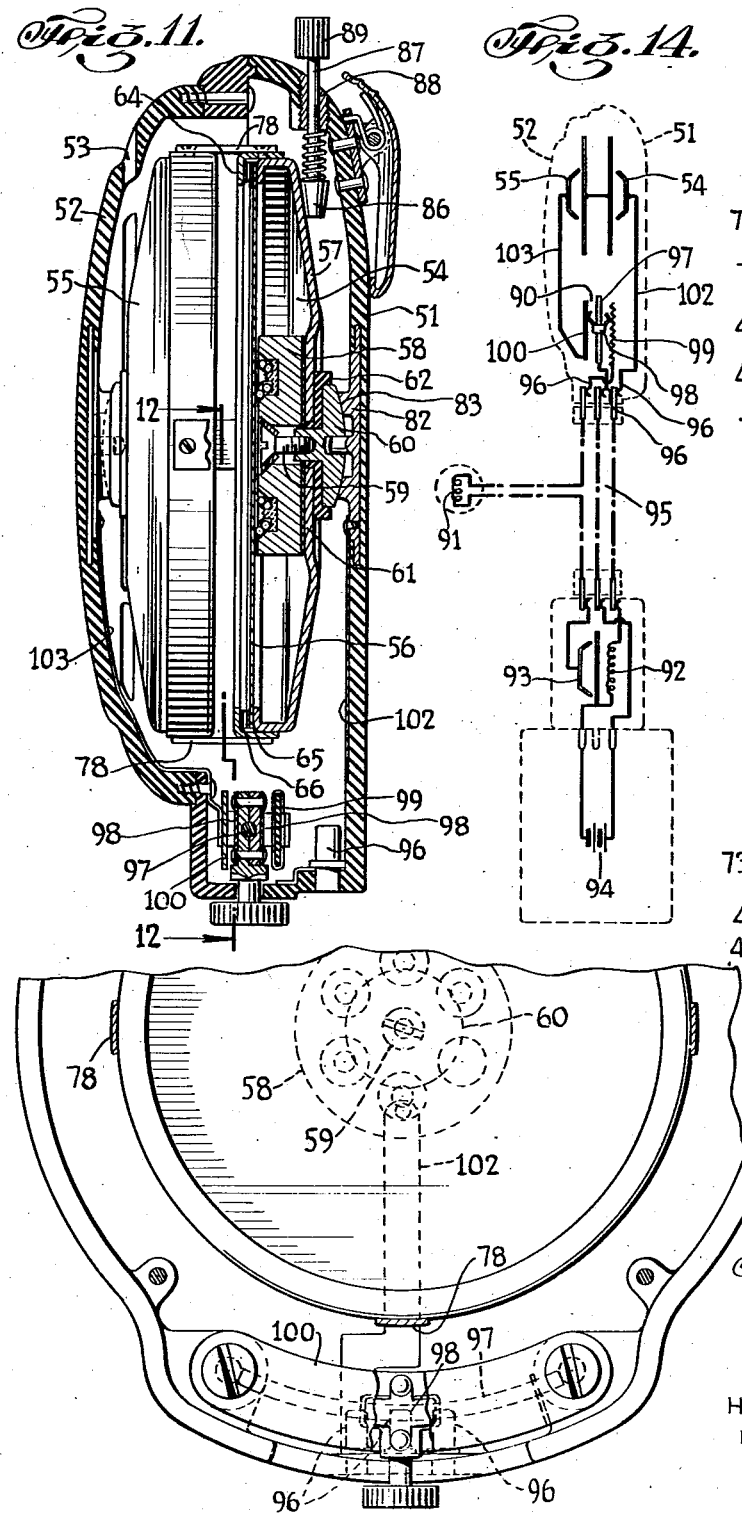

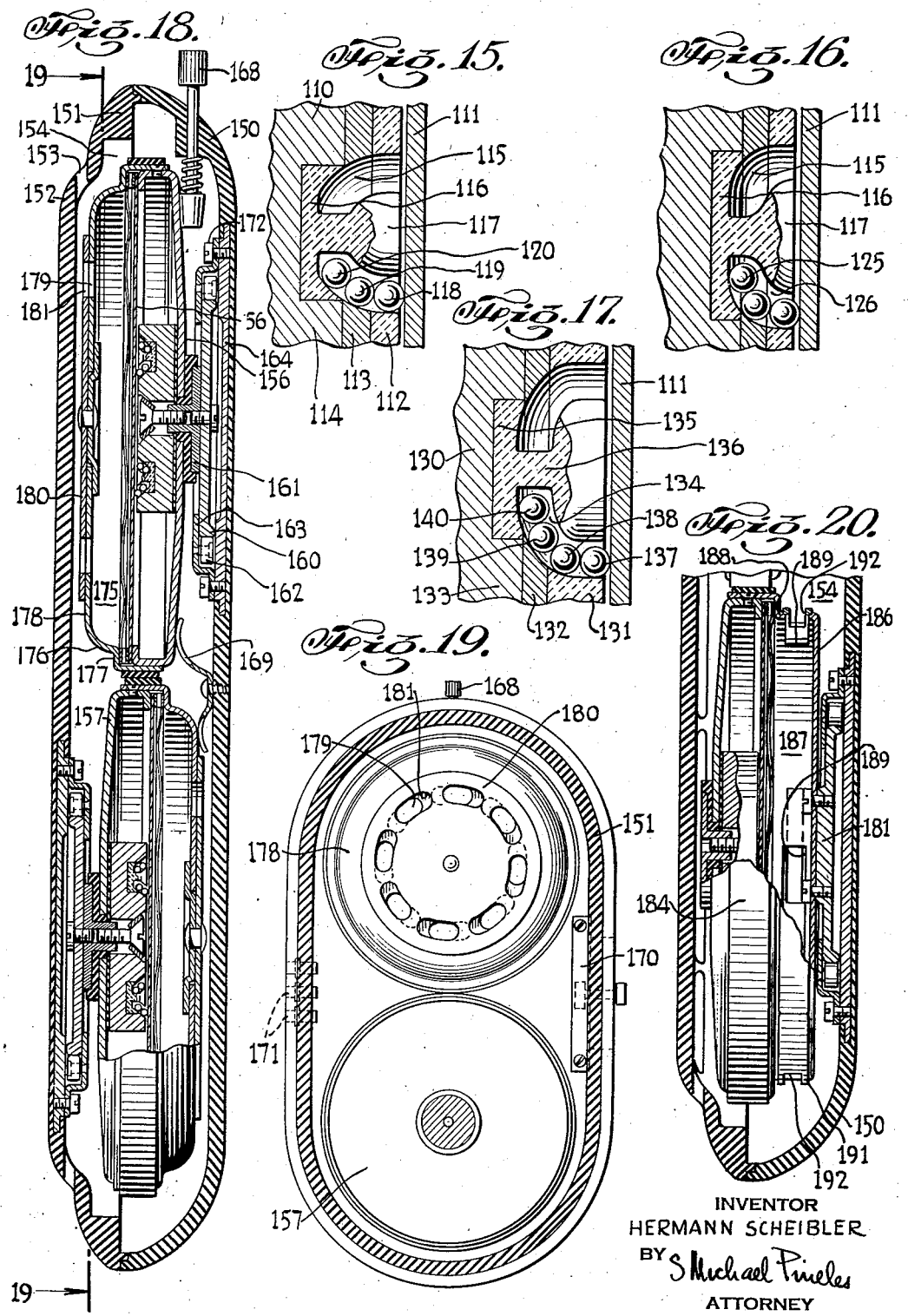

Patented Mar. 19, 1940

2,193,844

UNITED STATES PATENT OFFICE 2,193,844

HEARING-AID TRANSMITTER

Hermann Scheibler, Geneva, Switzerland, assignor to Sonotone Corporation, New York, N. Y., a corporation of New York Application December 28, 1936, Serial No. 117,798

2 Claims. (Cl. 179—127)

This invention relates to hearing-aid transmitters and it has among its objects an improved carbon ball transmitter for hearing-aids which is more efficient than the available carbon ball transmitters and have a much longer satisfactory operating life than other known transmitters of such type.

The foregoing and other objects of the invention will be best understood from the following description of exemplifications thereof, reference being had to the accompanying drawings, wherein Fig. 1 is a cross sectional view illustrating a carbon block cavity with the associated diaphragm portion and carbon balls of an ordinary carbon ball transmitter;

Fig. 2 is a view along line 2—2 of Fig. 1;

Figs. 3 to 6 are views similar to Fig. 2 illustrating a different angular operating position of the cooperating transmitter elements;

Fig. 7 is a view similar to Fig. 3 illustrating the cooperative relation of a carbon block cavity with the balls and diaphragm of a transmitter microphone exemplifying the invention;

Figs. 8 and 9 are views similar to Fig. 7 illustrating different angular operating positions of the transmitter elements;

Fig. 10 is a view similar to Fig. 7 illustrating another transmitter arrangement;

Fig. 11 is a vertical cross sectional view through a complete transmitter exemplifying the invention;

Fig. 12 is a horizontal sectional view along line 12—12 of Fig. 11;

Fig. 13 is an enlarged cross sectional view of the carbon block and diaphragm of the transmitter of Fig. 11;

Fig. 14 is a diagrammatic view of a hearing-aid device with a transmitter exemplifying the invention;

Figs. 15 to 17 are views similar to Fig. 7 illustrating further modifications of carbon ball transmitters of the invention;

Fig. 18 is a view similar to Fig. 11 illustrating a modified form of a complete transmitter exemplifying the invention;

Fig. 19 is a sectional view of the transmitter along line 19—19 of Fig. 18; and

Fig. 20 is a view similar to Fig. 18 of a further modification of a transmitter construction embodying the invention.

Most of the hearing-aid devices used at present consist of a transmitter which is actuated by the sound waves and a hearing-inducing receiver. such as a telephone or bone conduction receiver, which are interconnected through a cord and a microphone amplifier to a small portable low voltage battery for supply'ng amplified sound-frequency currents to the receiver. Since deafened persons are very sensitive and seek to conceal their impairment, such hearing-aid devices must be suitable for comfortable and inconspicuous wear on the body of the user and accordingly only relatively small batteries having a low supply voltage are practical for use in such hearing-aids. Consequently the transmitter as well as the microphone amplifier must be designed to operate with maximum sensitivity possible at such low supply voltage without materially impairing the intelligibility of the sound reproduction in the receiver. The elements of the device must not only be very small and light in weight to avoid being burdensome to the user, but they must be able to respond fairly uniformly at high efficiency to all important speech frequencies and they should operate satisfactorily under all conditions of use without requiring special attention and frequent reconditioning.

To secure maximum sensitivity, such wearable hearing-aids are usually equipped with carbon ball microphone transmitters having, as shown in Figs. 1 and 2 a carbon diaphragm 26 and a carbon block 27 having a plurality of cone-shaped cavities 28, each cavity containing a quantity of carbon balls 29 which form a heap resting in the space between the lower inclined wall of the cavity and the diaphragm and form a resistance path which varies the resistance between the carbon block and the diaphragm in accordance with the vibrations imparted to the diaphragm by sound waves propagated in the air for modulating the transmitter current passing between the transmitter electrodes and producing correspondingly modulated sound-frequency currents.

A typical carbon ball transmitter may use a carbon block having six cavities, each cavity being large enough to hold a heap of about ten loose balls of 0.8 millimeter diameter between the inclined bottom wall of the cavity and the adjacent surface of the transmitter diaphragm 26. In such transmitters the carbon balls perform two functions. First, through the contacts with the diaphragm and the carbon block, the carbon balls provide resistance paths for the current that is modulated by the vibrations of the diaphragm. Second, the forces exerted by the weight of the balls supply the pressure for maintaining intact the ball contacts through which the modulated current flows between the diaphragm and the carbon block so that the current should not be broken when the diaphragm vibrates.

Since such hearing-aid transmitters are worn by the user, they are operated in a variety of angular positions as they are tilted by the body of the user and the loose carbon balls in the cavities of a transmitter may assume in operation a great variety of different formations. Accordingly, the operation of these balls as variable resistance current paths between the diaphragm and the carbon block varies within wide limits and is very erratic. As a result the available carbon ball transmitters cannot operate with the required high efficiency and the modulated sound-frequency currents supplied by such transmitter lacks the required uniformity and is frequently very distorted.

Another serious difficulty encountered with such transmitters is due to the phenomenon known as packing or fading when the carbon granules become baked or stick together and the resulting reduction of output manifests itself in the fading of the sound output. The principal cause of packing or fading is the excessive heating of the carbon particles at their contact surfaces. Such excessive heating may be produced by sparking when contacts are broken, or by excessive current flow through contacts subjected to large pressures, or some similar occurrences. The heating of the carbon contacts is accompanied by a decrease of the contact resistance which in turn causes a further increase in the current, with consequent further increase of the heating, and so on until the packing takes place. Such initial abnormal heating will primarily occur at the carbon contacts which are subjected to excessive pressure, or at the contacts at which the current is broken, or at points with defective contact surfaces.

I have found that after a carbon ball transmitter has been in service for some period, the effective portions of the transmitter diaphragm and the carbon have arcuate traces of burns corresponding to the positions which were in engagement with the carbon balls during the operation of the transmitter, and that the diameter and the location of these traces is determined by the distance of the diaphragm from the surface of the carbon block. These traces of burning are due to some local heating at the points of the contact with the balls, and practical experience shows that serious fading or packing starts only after the transmitter has been in use for some time. As a result, hearing-aid transmitters heretofore had to be frequently reconditioned causing inconvenience and expense to the users.

The carbon ball transmitters of the invention as described below eliminate the principal difficulties encountered with the prior transmitters of this type and greatly reduce the troubles encountered in their operation.

The principles underlying the carbon ball transmitters of the invention will more readily be understood in the light of the following analysis of the operation of available standard carbon ball transmitters in four characteristic positions shown in Figs. 3 to 6 which three balls lying in the center plane of a transmitter cavity are likely to assume under various operating angles.

Thus, when such prior transmitter is in the vertical position, the three balls in a cavity may assume either the position shown in Fig. 3 in which the lower ball 31 engaging the diaphragm 26 and the inclined cavity wall 28, as well as the upper ball 32 engaging the diaphragm, are held in place by the rear ball 33 which lies on the inclined cavity wall 28 and engages the two front balls 31, 32 pressing them against the diaphragm, or in the position shown in Fig. 4 in which the rear ball 33 is only wedged between the upper front ball 32 and the inclined cavity wall. When the transmitter is tilted to the rear position shown in Fig. 5, the lower ball 31 remains in its position of engagement with the diaphragm 26 and the cavity 28, while the two balls 33 and 32 lie on the cavity wall and exert pressure on the lower ball 31; and when the transmitter is tilted to the forward position shown in Fig. 6, the two balls 32 and 33 engage only the transmitter surface above the ball 31 and exert pressure on the lower ball 31.

I have found that the output of transmitters operating with balls in the positions corresponding to Figs. 3 and 4 is much worse than the output of transmitters operating with balls in the positions shown in Figs. 5 and 6, and that the principal reason for the inferior operation of the transmitters in the positions of Figs. 3 and 4 as compared with the positions of Figs. 5 and 6 is due to a detrimental action of the balls 32 which lie in the cavity above the lower ball 31.

In transmitters operating with balls in formations like those shown in Figs. 3 and 4, the ball 32 does not follow closely the vibrations of the diaphragm, but exerts a strong damping effect upon the diaphragm vibrations, and the ball arrangement shown in Fig. 4 is the worst. I have found that if only two of the cavities of a transmitter having six cavities have balls in positions shown in Figs. 3 and 4, the efficiency of the transmitter is very materially reduced.

I have also found that the influence of the balls occupying the position corresponding to ball 32 in Figs. 3 and 4 contributes very little to the modulation of the current passing through the transmitter because only a small part of the total current through the transmitter is modulated by the vibrations of these balls. Tests with such transmitters also showed that although only about one-tenth of the total transmitter current passes through paths including the balls occupying the positions such as those of ball 32, the unfavorable damping effect of such balls may reduce the efficiency of a transmitter over 50%.

In accordance with the invention, the cooperating electrodes of a carbon ball transmitter are so shaped and arranged as to prevent the carbon balls constituting the variable resistance path between the cooperating electrodes from assuming positions similar to those assumed by the ball 32 in Figs. 3 and 4 in which they impede and damp the vibrations of the diaphragm and have only a distributing effect on the modulation of this current. To this end the loose balls which form the variable resistance path between the microphone electrodes are confined in a cavity or groove which is so shaped that the loose balls can assume only a single ball row or layer formation during their engagement with the electrodes and tend to maintain intact the contacts traversed by the transmitter current which is modulated by the vibrations of the diaphragm electrode acting on the balls.

With such electrode arrangement, the single ball layer formation will have only a single row of balls in contact with the diaphragm portion facing the cavity, while utilizing the weight of the balls in the cavity for exerting a pressure that maintains intact the contacts of the balls traversed by the modulated current without materially impeding the action of the diaphragm throughout its vibrating range.

The principles of the invention will be more readily understood from its exemplification shown in Figs. 7 to 9 which illustrate a portion of a carbon block 40 with the cooperating diaphragm portion 41 of a microphone transmitter embodying the invention in different angular operating positions. The carbon block 40 of this transmitter may have cavities 42 of conoidal shape similar to the cavities of ordinary carbon ball transmitters, but differing therefrom by the provision of a special ball stop 43 of a heatproof insulating substance, such as ceramic material, which has a cylindrical rear portion 44 suitably secured within the carbon block 40 and a front portion having an outwardly flaring guide surface forming with the cavity wall 42 an annular conically shaped groove 45 that is sufficiently wide to permit a single layer of loose balls 46, 47 to move freely in the space between the walls of the groove and provide a single ball layer conducting path between the electrode surface of the groove 45 and a facing portion of the diaphragm.

In a transmitter with such or similar ball groove cavities, a plurality of loose balls placed in a cavity will assume a formation in which one row of balls 46 is maintained in engagement with the diaphragm 41 and the conducting surface of the cavity electrode, while a second row of loose carbon balls 47 lying on the inclined cavity wall exerts pressure on the rear sides of the contact balls 46 for maintaining positive contact engagement of the contact balls 46 with the diaphragm as well as the contact surface of the carbon cavity.

This operative relationship of the balls to the cooperating electrodes will be maintained not only in the vertical position of the transmitter as shown in Fig. 7, but will remain effective in all angular positions in which a transmitter may have to operate, as shown, for instance, in Figs. 8 and 9 illustrating the cooperating transmitter elements in a rearwardly and forwardly tilted position, respectively. In each of these positions, the contact balls 46 in the front row of the cavity engage the diaphragm as well as the inclined electrode surface of the cavity 45, while the pressure balls 47 in the rear row exert pressure which maintains the contacts of the contact balls intact during the vibrations of the diaphragm.

In all positions of the transmitter the balls lie loosely on the cavity wall, and although the rear balls maintain intact the contacts of the front balls, they do not resist the vibrations of the diaphragm and do not exert any damping effect. With such electrode arrangement, tilting of the transmitter will not materially change the flow of the modulated current through the conducting paths formed by the balls bridging the gap between the electrode surfaces, although the pressure exerted by the row of rear balls will be somewhat reduced when the transmitter is tilted to the position of Fig. 8 and the pressure will be somewhat increased when the transmitter is tilted to the position of Fig. 9. Since the contact pressure with which the pressure balls 47 rests on the inclined conducting cavity in the positions of Figs. 7 and 8 is very light, the part of the transmitter current which flows by way of these balls is very small compared to the current passing through the contact balls 46, and accordingly the breaking of the contacts of the pressure balls 47 with the cavity wall when the transmitter is tilted to the position of Fig. 9 does not materially disturb the operation of the transmitter.

In order to prevent changes in the transmitter current by the motion of the pressure balls from the position in Fig. 7 to the position in Fig. 9, the surface of the cavity portion which is or may come into engagement with the row of pressure balls 47 is rendered non-conducting. This may be accomplished, for instance, in the way shown in Fig. 10, by making only the front layer 48 of the electrode block of carbon material and using for the rear wall 49 of the electrode block as well as for the ball stop 50 a heatproof insulating material, such as a ceramic substance.

The special electrode configuration of the carbon ball transmitter of the invention described above has many other inherent advantages. In carbon ball transmitters, the distance between the diaphragm and the carbon block is very limited, for instance, when using carbon balls having a diameter of 0.8 millimeter, the distance between the diaphragm and the carbon block must be less than 0.5 millimeter in order to make it impossible for the balls to drop out of the cavity and to prevent balls from getting into the space between the front wall of the carbon block and the diaphragm and stopping the vibrations of the diaphragm. On the other hand, the diaphragm must be spaced sufficiently far away from the carbon block to prevent direct contact between the diaphragm and the carbon block when the diaphragm operates with large amplitudes. Accordingly, the proper spacing of the diaphragm from the block is a difficult problem.

This problem is particularly critical in ordinary carbon ball transmitters of the type illustrated in Figs. 3 and 4 because only a very small difference in the gap length between the diaphragm and the carbon block may bring a ball of the upper ball layer into a position where it is wedged in place to prevent the vibration of the diaphragm. In such transmitters there is only one critical gap distance between the diaphragm and the block surface to which the diaphragm must be carefully adjusted when assembling the transmitter.

This difficulty in assembling prior art transmitters is eliminated in transmitters with ball guides of the invention which confine the balls to a single layer formation in the ball cavity and eliminate the formation of ball configurations with superimposed balls that tend to become wedged in place and stop the vibrations of the diaphragm. Accordingly, the effective gap between the diaphragm may be varied without detrimentally affecting the operation of the transmitter. This is of great advantage because it makes possible easy reconditioning of a transmitter after it has been used long enough to cause the development of burning traces on the contact surfaces by a simple adjustment of the effective gap of the diaphragm.

It can be readily seen from Fig. 3 or Fig. 7 that by varying the spacing of the diaphragm from the carbon block, the point of contact between the balls and the diaphragm as well as the cavity wall against which they rest is varied. In the transmitters of the invention using ball guides which confine the balls to single layer formations within the cavity, the range of the gap distance between the diaphragm and the block can be varied without impairing the efficiency of the transmitter.

In transmitters of the invention using balls with a diameter of 0.5 millimeter, the distance of the diaphragm from the electrode block may be adjusted within a permissible gap range of about 0.015 of an inch without detrimentally affecting the operation of the transmitter. Thus, the transmitter may be made first with a gap spacing of 0.007 of an inch, and then after the transmitter has been in use for a certain time and produced traces of burning on the active electrode contact surfaces, another surface portion of the transmitter and the cavity may be brought into engagement with the ball by simply increasing the effective distance of the diaphragm to 0.011 of an inch, for instance, by adding an additional spacing washer of 0.004 of an inch between the diaphragm and its supporting surface. A similar operation can be repeated after continued use resulted in new burning traces with the gap spacing of 0.011 by increasing this spacing to 0.015 of an inch. In this way the life of the transmitter may be readily multiplied. In addition, the cost of the special new carbon blocks and diaphragms is eliminated.

The carbon ball transmitter of the invention with its arrangement for confining the effective balls to a single layer formation is thus instrumental not only in producing a large modulated current with a minimum of distortion, but also secures more uniform distribution of the current through the balls in contact areas of the transmitter, prevents the development of excessive contact pressures that result in packing and fading of the transmitter, eliminates the critical gap distance between the diaphragm and the cavity electrode, and makes possible the use of the transmitter with different effective gap adjustment for bringing different effective areas of the electrodes into service and thus multiply the life as well as the usefulness of the transmitter.

Another feature of the invention is a transmitter arrangement which makes it possible to quickly and easily bring different effective segmental portions of the transmitter electrode surface into operative engagement with the balls to prevent overheating of the transmitter during prolonged continuous operation and reduce the difficulties resulting from the formation of burning traces on the electrodes. This may be done by a rotatable mounting of the transmitter or its microphone units so that it may be turned to cause the loose balls in the transmitter cavities to move into a position in which they engage fresh cool surface portions of the diaphragm and cavity electrodes.

Practical experience shows that fading depends on the condition of the carbon parts and that serious fading or packing starts only after the transmitter has been in use for some time, and the longer the transmitter was in continued use the more frequent the fading becomes.

In accordance with the invention, the transmitter is so arranged that it may be readily turned from one segmental operating position to another so as to bring a different segmental portion of the electrode surfaces into contact with the transmitter balls. This enables the user to quickly change the effective electrode surfaces which are in contact with the balls and overcome difficulties that may develop during the use of the hearing-aid.

Should an undesirable packing or fading occur, a simple small turn of the transmitter causes the packed balls to break away from each other and fresh cool portions of the balls are brought into contact with fresh cool portions of the block cavity and the diaphragm. With such arrangement a person who uses the hearing-aid continuously for a long time can easily bring the transmitter into a new effective operating position whenever it shows a sign of fading, and in each new operating position the transmitter will operate with fresh carbon ball portions as well as fresh electrode surface portions without impairing the modulation of the current in the transmitter. Furthermore, by arranging the transmitter so that it is possible to turn the transmitter and bring quickly a new effective segmental electrode area into operation, the burns that are produced on the contact surface are distributed over the entire available contact area, the fading and packing of the transmitter is largely eliminated, and the necessity for frequent repair is eliminated.

The construction of a transmitter combining the features of the invention described above will now be described in connection with Figs. 11 to 13. It comprises a casing 51 molded from a synthetic resin or similar insulating material having a removable front wall 52 enclosing an annular hollow chamber, the cover having a protruding wall portion provided along its periphery with openings in the form of slots 53 through which sound waves reaching the air bordering the transmitter casing are propagated to the air in the casing chamber. Within the casing is mounted a revolvable assembly of two microphone units 54, 55, each unit comprising a metallic supporting cup 57 to which is secured an electrode block 58 held in place by a screw 59 which engages a bushing of a metallic stud 60 which is insulated from the cup by interposed insulating spacers 61, 62.

A carbon diaphragm electrode 56 is secured to the periphery of the cup 57 by means of a clamping ring 64, a spacing washer 65 and a spring washer 66 serving to hold the diaphragm at a predetermined gap distance from the front surface of the electrode block 58 mounted on the supporting cup 57.

As shown in detail in Fig. 13, the electrode block 58 is similar in shape to the carbon block electrodes of ordinary carbon ball transmitters and consists of a disc-shaped carbon electrode plate 70 clamped together with the underlying supporting block 72 to the center portion of the supporting cup 57 by the screw 59. The electrode disc 70 is provided with, for instance, six conical ball cavities 73 and the rear wall of each cavity is formed by an annular insert 74 of heatproof insulating substance, such as ceramic material, which has a forwardly projecting ball stop 75 similar in shape to the ball stop 43 of Figs. 7 and 8 to cause a plurality of loose carbon balls 46, 47 placed in the groove formed by the stop and the cavity surface to assume a single layer ball formation with a row of contact balls 46 and a row of pressure balls 47 as explained in connection with Figs. 7 to 10.

The two similar microphone units 54, 55 are joined to each other across an open air space by three or more rigid metallic spacers 78 to form a self-supporting double microphone unit, the diaphragms of which are actuated by the sound waves within the casing chamber.

The rear wall of the casing 51 and the casing cover 52 have imbedded therein bearing plates 82 provided with bearing surfaces 83 which engage similarly shaped outer surfaces of the button studs 60 of the two microphone units to permit revolving motion of the microphone assembly on the bearing surfaces 83. Any suitable externally accessible actuating means may be provided for rotating the revolvably mounted microphone assembly within the casing. It may consist of a friction roller 86 of rubber, for instance, mounted on a small spindle 87 which is journalled in a bearing 88 imbedded in the casing wall and is pressed into engagement with the conical rear wall portion of the supporting cup 57 of the transmitter unit 54, so that by turning a knob 89 on the upper end of the spindle 87, the friction roller 86 will rotate the microphone assembly within the chamber and thus bring fresh portions of the diaphragm and the cavity electrode surfaces into engagement with the balls of the two microphone units 54, 55 in the way explained hereinabove.

The transmitter is designed to operate as a part of a wearable hearing-aid device illustrated diagrammatically in Fig. 14. It comprises the transmitter casing with the two microphone units 54, 55 and a control unit 90, a hearing-inducing receiver with an actuating winding 91, and a microphone amplifier unit having an actuating winding 92 and an amplifier microphone 93 which are interconnected with a low voltage battery 94 through a cord 95. The transmitter has three cord terminals 96 and the control unit, which for convenience is mounted within the transmitter casing 51, has a contact rod 97 provided with a contact slider 98 for establishing detachable connections with a rheostat member 99 and a contact strip 100. When the contact slider 98 is in the operating position, as shown in Fig. 14, the two microphone units 54, 55 of the transmitter are connected in series with the amplifier winding to the battery 94 for supplying modulated sound-frequency input currents to the amplifier, and the amplifier microphone 93 is connected in series with the receiver winding to the battery for actuating the receiver with amplified output currents.

As shown in Figs. 11 and 12, the control unit 90 comprising the slider contact rod 97, the rheostat strip 99 and the contact strip 100, as well as the transmitter terminals 96, are mounted on the bottom wall of the transmitter casing. When the microphone assembly is mounted in its place, the terminal stud connection 60 to the block electrode 58 of the microphone unit 54 is connected through a metal strip 102 on the inner casing wall to the transmitter terminal 96 leading to the amplifier winding, and the terminal stud connection to the block electrode of the other microphone unit 55 is connected through a metal strip 103 on the transmitter cover 52 to the contact member 100 of the control unit, the slider rod 97 and the rheostat being connected to the other two transmitter terminals 96. A grip extending from the slider 98 through a groove in the transmitter casing enables easy control of the operation of the transmitter.

By mounting the two serially connected microphone units 54, 55 so that their cavities face in opposite directions, any increase in the resistance between the ball contacts of one unit when the transmitter is tilted from its vertical position will be balanced by a corresponding decrease in the resistance of the other unit, thus further reducing fluctuations of exciting direct current flowing through the transmitter and the actuating coil of the microphone amplifier, also thus eliminating the danger of packing the carbon granules in the amplifier microphone chamber.

The transmitter described above combines the advantages of the single layer ball arrangement and the revolvable balanced mounting of the microphone unit and will supply a large output of modulated current with minimum distortion while worn by the user in vertical or tilted positions without requiring frequent reconditioning and without upsetting the user in case it is overheated and tends to fade during continuous prolonged use.

Fig. 15 illustrates the construction of the microphone electrodes of a transmitter of increased sensitivity embodying another form of the invention. It comprises an electrode block 110 cooperating with a diaphragm 111 similar in shape to the standard microphones. The electrode block 110 consists of a front wall member 112 of a heatproof insulating substance, such as ceramic material, lying over a disc-shaped electrode member 113 of carbon material which is suitably clamped to a supporting block 114 of a microphone unit. The front wall of the electrode block is provided with a plurality of cavities 115 shaped in the way shown in the drawings, each cavity having a rear wall 116 of heatproof insulating material with a projecting ball guide 117 forming with the walls of the cavity 115 a groove shaped to cause a plurality of balls placed in each cavity to assume a single ball layer formation having a row of front contact balls 118 which engage the diaphragm 111, a row of rear contact balls 119 which engage the electrode surface of the cavity electrode 113, and a row of rear balls 120 which act as pressure balls and hold intact the contacts traversed by the current flowing between the diaphragm and the cavity electrode 113.

The effective pressure exerted on the contact surfaces of the balls through which the transmitter currents flows may be increased by suitably shaping the cavity grooves of the transmitter. Thus, the transmitter electrode assembly shown in Fig. 16 is provided with cavities and ball stops forming grooves of steeper curvature so that the row of pressure balls 125 in the rear of the cavity groove 126 exerts on the rows of contact balls which carry the transmitter current a larger pressure than the row of pressure balls in the groove arrangement of Fig. 15.

The sensitivity of the microphones of the type shown in Figs. 15 and 16 may be further increased by using instead of two serially acting parallel rows of balls 118, 119 in the way shown in Fig. 15, a larger number of such serially acting parallel rows of conducting balls for the variable resistance path between the diaphragm and the cavity electrode surface.

An electrode arrangement of such transmitter is shown in Fig. 17. It comprises a diaphragm 111 cooperating with an electrode block 130 consisting of a front wall member 131 of insulating heatproof material with an underlying carbon electrode layer 132 supported on a supporting block 133. The front wall is provided with ball grooves 134 having rear walls formed of insulating inserts 135 with projecting ball guides 136. By increasing the thickness of the insulating front wall 131, the depth of the cavity groove 134 is increased to hold three serially acting parallel ball rows 137, 138, 139 which form the variable resistance between the diaphragm 111 and the cavity electrode 132, a row of pressure balls 140 serving to maintain intact the contacts of the balls during the vibrations of the diaphragm.

In Figs. 18 and 19 is shown an assembled transmitter illustrating another form of the invention in which the two microphone units with oppositely directed diaphragms are mounted one above the other in different portions of a thin transmitter unit shaped to lie flat and fit as a thin cigarette case against the body of the user. It comprises an elongated flat casing 150 which is enclosed by a removable cover 151 having a protruding front wall 152 provided along its border with lateral openings in the form of slots 153 for the propagation of sound waves from the surrounding air to the air within the chamber 154 of the casing. Two microphone units 156, 157, similar in construction to the microphone units shown in Figs. 11 to 13, are located in different longitudinal portions of the casing chamber, the carbon ball cavities of the two microphone units facing in opposite directions to maintain balanced and uniform operation of the serially connected microphone units under all operating conditions.

The upper microphone unit 156 is revolvably mounted on the inner casing wall by means of a roller 160 which is detachably secured to the supporting stud 161 of the microphone unit and is revolvably supported on a plurality of rollers 162 mounted on a retaining ring 163 which is attached by screws to a suitable anchor plate 164 imbedded in the molded casing wall of the transmitter so as to permit the microphone unit to be rotated on the rollers 162 for bringing different segmental portions of the microphone electrodes into operative engagement with the loose carbon balls in the microphone cavities.

In a similar way, the lower microphone unit 157 is revolvably mounted on the cover wall 152 with its periphery in suitable frictional engagement with the periphery of the upper microphone unit 156 so that when the upper microphone unit is rotated by a suitable control knob drive 168, such as that of Fig. 14, the other microphone is likewise rotated on its roller support to bring new segmental surfaces into the operative position. The series connections of the two microphone units to a control unit 170 and the terminals 171 mounted within the transmitter casing may be similar to those described in Fig. 14.

Each of the two microphone units 156, 157 is also shown provided with a resonant air chamber 175 formed by a cylindrical wall extension 176 from the clamping ring 177 of each unit and a front wall 178 provided with a plurality of orifices 179 through which the air in the chambers 175 of the two microphone units is acoustically coupled with the air in the casing chamber 154. In addition, the front wall 178 of each microphone air chamber 175 is provided with a revolvably mounted shutter 180 having a plurality of control orifices 181 so that by turning the shutter, different portions of the shutter orifices 181 are brought into registration with the chamber wall orifices 179 for adjustably varying the resonance characteristics of the individual microphone chambers 175 and their acoustic coupling with the common casing chamber 154, as well as for adjustably fixing said characteristics and coupling at values which are most effective for producing a transmitter output that will selectively amplify sound vibrations in the frequency range as to which the hearing sensitivity of the deafened user is reduced.

In Fig. 20 is shown a transmitter similar to that of Figs. 13 and 19 in which the lower microphone unit 184 with its ball cavity facing in a direction opposite to the direction of the cavity of the upper microphone unit is rotatably mounted on the bottom part of the casing wall 150 by means of a roller 185 which is attached to the front wall 186 of the resonant chamber 187 of the microphone unit, the roller 185 being rotatably supported on the casing wall in a way similar to the support of the upper microphone unit 156.

The cylindrical wall 188 of the resonant chamber 187 has a plurality of orifices 189 for acoustically coupling the air in the chamber 187 with the air in the surrounding casing chamber 154 in the way described above. A ring-shaped shutter 191 slidingly mounted on the cylindrical chamber wall 188 to bring different portions of the shutter orifices 192 into registration with the chamber orifices 189 is used for adjustably fixing the resonance characteristics of the individual microphone chamber 187 and its acoustic coupling with the outer casing chamber 154 so as to produce sound-frequency output currents of a character required to compensate for the defects in the hearing ability of the user.

The principles of the invention disclosed in connection with the exemplifications described above will suggest many other modifications of the invention. It is accordingly desired that the appended claims be given a broad construction commensurate with the scope of the invention.

I claim:

1. In a hearing aid transmitter microphone, a microphone member having a cavity with an exposed electrode surface, a plurality of loose conducting balls engaging the electrode surface in said cavity, and a vibratory diaphragm having an electrode surface facing said cavity so as to confine said balls in said cavity and vary the effective resistance formed by the engagement of the balls with the cooperating electrode surfaces for modulating the current flowing between said electrode surfaces in accordance with the vibrations of said diaphragm, the interior of said cavity and the surface of said diaphragm facing the cavity being shaped and arranged to form a substantially conically shaped endless channel having substantially conical wall surfaces spaced by a distance less than about twice the diameter of said balls for causing said balls to assume a single layer formation along a portion of said channel so that a row of said balls is held in contact with the vibratory diaphragm electrode surface by adjacent balls held in said channel at a higher level than the balls of said row.

2. In a hearing aid transmitter microphone, a substantially rigid microphone member having a conical cavity with an exposed electrode surface, a plurality of loose conducting balls engaging the electrode surface in said cavity, and a vibratory diaphragm having an electrode surface facing said cavity so as to confine said balls in said cavity and vary the effective resistance formed by the engagement of the balls with the cooperating electrode surfaces for modulating the current flowing between said electrode surfaces in accordance with the vibrations of said diaphragm, the interior of said cavity and the surface of said diaphragm facing the cavity being shaped and arranged to form a substantially conically shaped endless channel having substantially conical wall surfaces spaced by a distance less than about twice the diameter of said balls for causing said balls to assume a single layer formation along a conical surface so that a row of said balls shall be held in contact with the vibratory diaphragm electrode surface by an adjacent row of balls held at a higher level than the balls of the first row.

HERMANN SCHEIBLER.